United States Patent
Suthar

(10) Patent No.: US 10,664,733 B2
(45) Date of Patent: May 26, 2020

(54) TRANSACTION CARD WITH SECURED MAGNETIC STRIP AND METHOD FOR MAKING THE SAME

(71) Applicant: Capital One Services, LLC, McLean, VA (US)

(72) Inventor: Om J. Suthar, Brambleton, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/141,540

(22) Filed: Sep. 25, 2018

(65) Prior Publication Data

US 2019/0026614 A1     Jan. 24, 2019

Related U.S. Application Data

(63) Continuation of application No. 15/819,933, filed on Nov. 21, 2017, now Pat. No. 10,115,047.

(60) Provisional application No. 62/432,377, filed on Dec. 9, 2016.

(51) Int. Cl.
| | |
|---|---|
| *G06K 19/06* | (2006.01) |
| *G06K 19/077* | (2006.01) |
| *G06K 19/02* | (2006.01) |
| *G06K 19/04* | (2006.01) |
| *G06Q 20/34* | (2012.01) |

(52) U.S. Cl.
CPC ..... *G06K 19/06196* (2013.01); *G06K 19/022* (2013.01); *G06K 19/042* (2013.01); *G06K 19/06187* (2013.01); *G06K 19/07722* (2013.01); *G06K 19/07745* (2013.01); *G06Q 20/34* (2013.01)

(58) Field of Classification Search
CPC ... G06K 19/06196; G06K 19/07; G06Q 20/34
USPC .................................. 235/487, 488, 493, 492
See application file for complete search history.

(56) References Cited

U.S. PATENT DOCUMENTS

| | | | | |
|---|---|---|---|---|
| 3,283,713 A | * | 11/1966 | Wooster | B41L 47/02 101/369 |
| 3,520,758 A | * | 7/1970 | Wiest | G03C 1/93 283/109 |
| 3,821,060 A | * | 6/1974 | Braca et al. | G06K 19/06196 156/298 |
| 5,544,014 A | * | 8/1996 | Atsumi | G06K 19/04 257/679 |

(Continued)

OTHER PUBLICATIONS

European Patent Office, Communication pursuant to Article 94(3) EPC in corresponding application No. EP 17205264.9, dated Apr. 16, 2019 (4 pages).

*Primary Examiner* — Paultep Savusdiphol
(74) *Attorney, Agent, or Firm* — Finnegan, Henderson, Farabow, Garrett & Dunner, LLP

(57) ABSTRACT

A transaction card construction and a method for making transaction cards provides increased security for transaction card magnetic strips. The transaction card construction includes a card inlay and a clear card body. The card inlay is formed via a lamination press process with the magnetic strip attached to a back surface of the card inlay. The card body may have a window through which a data storage element may be exposed for accessing, such as by a magnetic stripe reader or EMV chip reader. The card body may be formed by adhering the card inlay to the clear card body.

20 Claims, 9 Drawing Sheets

(56) References Cited

U.S. PATENT DOCUMENTS

| | | | |
|---|---|---|---|
| 7,134,603 B2* | 11/2006 | Batoha | G06K 19/02 235/491 |
| 2005/0247795 A1* | 11/2005 | Riedl | G06K 19/06196 235/488 |
| 2011/0025505 A1 | 2/2011 | Rancien et al. | |
| 2015/0021403 A1* | 1/2015 | Finn | G06K 19/07747 235/492 |
| 2015/0097037 A1* | 4/2015 | Narendra | G06K 19/07345 235/488 |

* cited by examiner

TRANSACTION CARD WITH SECURED MAGNETIC STRIP AND METHOD FOR MAKING THE SAME

CROSS-REFERENCE TO RELATED APPLICATION

This application is a continuation of U.S. patent application Ser. No. 15/819,933, filed Nov. 21, 2017, which claims the benefit of priority under 35 U.S.C. 119(e) to U.S. Provisional Application No. 62/432,377, filed Dec. 9, 2016, and titled "TRANSACTION CARD AND METHOD FOR MAKING THE SAME FOR SECURING MAGNETIC STRIP." The disclosures of each application are hereby incorporated by reference in their entireties.

TECHNICAL FIELD

The disclosed embodiments generally relate to transaction cards, and particularly, to clear transaction cards with secured magnetic strips.

BACKGROUND

Transaction cards, such as credit and debit cards, have increasingly become a primary means for customers to complete financial transactions. Currently transaction cards are typically constructed in a sheeted laminate press. The shape of the card is die cut and then the card is personalized. Typically, transaction cards are cut from laminated sheets of polyvinyl chloride (PVC) or polycarbonate (PC), or other similar materials. After the overall shape of the card is formed, the card may be modified to add functional and/or visual features. For example, a magnetic strip and/or microchip may be affixed to one side, the card may be stamped with the card number and customer name, and color or a design may be added for appearance.

In addition, as transaction cards increase in prevalence, expectations for transaction card quality have increased. Transaction cards have increasingly been made to meet higher standards regarding materials, durability, and especially security. For example, according to traditional card construction standard, the magnetic strip is not secured at all, and can be peeled off with ease. That may expose a potentially larger propensity for credit card fraud. Further, traditional card manufacturing method substantially limits card construction material to PVC, PC, and other similar materials, thus there has been a significant lack of innovation in card materials in card manufacturing.

The present disclosure is directed to overcoming one or more of the problems set forth above and/or other problems associated with conventional/traditional transaction cards.

SUMMARY

The disclosed embodiments relate to a transaction card and a process/method for constructing the transaction card, wherein the transaction card includes a laminated card inlay that is secured into a clear plastic card housing/body with a window provided for a magnetic strip to sit flush with a back surface of the clear card body.

The envisioned embodiments include a transaction card. The transaction card can include a card inlay with a first surface and a second surface. The transaction card can also include a first data storage component having a first surface and a second surface. The first surface of the first data storage component can be in contact with the second surface of the card inlay. The transaction card can also include a clear card body. The clear card body can include a first surface; a second surface; and a window formed in the clear card body and housing the first data storage component. The card inlay can be adhered to the clear card body such that: a portion of the second surface of the card inlay contacts a portion of the first surface of the clear card body; the first data storage component is exposed through the window; and the second surface of the first data storage component is flush with a portion of the second surface of the clear card body.

The second surface of the first data storage component, in some aspects, may be substantially flush with a portion of the second outer surface of the transaction card. The first surface of the first data storage component, in various aspects, may be substantially flush with a portion of the first outer surface of the transaction card. A portion of the inner surface of the card body may be substantially flush with the outer surface of the card inlay, in some aspects, and can form a portion of the first outer surface of the transaction card. The card inlay may include a pocket formed therein, and the transaction card may include a second data storage component embedded in the pocket, in various aspects. The card body may include a pocket formed therein, and the transaction card may include a second data storage component embedded in the pocket, in some aspects. In some aspect, the card inlay may be substantially translucent, while in various aspects, both the card inlay and the card body may be substantially translucent. The first data storage component may be a magnetic strip, in some aspects. The card inlay may include a top layer and a bottom layer, in some aspects, and the top layer and the bottom layer may be lamination-pressed to form the card inlay. The top layer may be made of polycarbonate, in some aspects, and the bottom layer may be made of polyvinyl chloride, in various aspects.

The window may have a plurality of side walls and the first data storage component may have a plurality of side walls, in various aspects. A gap between the plurality of side walls of the window and the plurality of side walls of the first data storage component, in some aspects, may have a tolerance less than +/−0.5 mm.

The envisioned embodiments include a method for manufacturing a transaction card. This method can include multiple steps. A step can include providing a first sheet laminate and a second sheet laminate. Another step can include forming a top layer of a card inlay from the first sheet laminate and a bottom layer of the card inlay from the second sheet laminate. A further step can include forming the card inlay by lamination-pressing the top layer and the bottom layer. An additional step can include attaching a first data storage component to a bottom surface of the card inlay. A step can include forming a clear card body by injection-molding. Another step can include forming a window in the clear card body via a milling process. And an additional step can include adhering the card inlay to the clear card body. A portion of the bottom surface of the card inlay can contact a first portion of a top surface of the clear card body. The first data storage component can be exposed through the window. A bottom surface of the first data storage component can be flush with a portion of a bottom surface of the clear card body.

The method may further include, in some aspects, creating a pocket in the card inlay, and embedding a second data storage component in the pocket. The second data storage component may be a microchip, in various aspects. The window may be formed by a milling process, in some aspects, and the card body may be injection-molded, in various aspects. The card body may be substantially translucent and can be made of a clear resin mixture including a thermoplastic elastomer, in various aspects. The top layer and the bottom layer, in some aspects, may be lamination pressed to form the card inlay.

The envisioned embodiments include another transaction card. This transaction card may include a card inlay having a material layer and an inlay backer. A magnetic stripe can be adhered to the inlay backer. The transaction card can include a clear card body for housing the card inlay with a cut-out window for exposing the magnetic stripe. The inlay backer may be laminated to the material layer.

A first surface of the card inlay, in some aspects, may include a first outer surface of the transaction card. The first surface of the card inlay may be a surface distal from the clear card body. A surface of the magnetic stripe may be substantially flush with a second outer surface of the transaction card, in some aspects. The surface of the magnetic stripe may be a surface exposed through the cut-out window, and the second outer surface of the transaction card may be opposite the first outer surface of the transaction card.

The card inlay may include a pocket formed therein, in some aspects, and the transaction card further may further include a second data storage component embedded in the pocket. The clear card body may include a pocket formed therein, in various aspects, and the transaction card may further include a second data storage component embedded in the pocket. In various aspects, the card inlay may be substantially translucent. The material layer may include one or more of copper, hammered metal, or wood, in some aspects. The inlay backer may include stainless steel, in various aspects. The clear card body may be made of a clear resin, in some aspects. The clear card body, in some aspects, may be injection-molded. The material layer, in various aspects, may be made of polycarbonate and the inlay backer may be made of polyvinyl chloride.

The envisioned embodiments include a method of manufacturing a transaction card. This method can include multiple steps. A step can include providing a material layer and an inlay backer. Another step can include forming a card inlay by lamination-pressing material layer and the inlay backer. A further step can include attaching a magnetic stripe to the inlay backer. An additional step can include forming a clear card body. A further step can include forming a window in the clear card body. And an additional step can include adhering the card inlay to the clear card body such that the magnetic stripe is exposed through the window.

The method may further include, in some aspects, creating a pocket in the card inlay, and embedding a second data storage component in the pocket. The window may be formed, in some aspects, by a milling process. The clear card body may be injection-molded, in various aspects. The clear card body may be substantially translucent and made of a clear resin mixture including a thermoplastic elastomer, in some aspects. The top layer and the bottom layer, in various aspects, may be lamination pressed to form the inlay.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
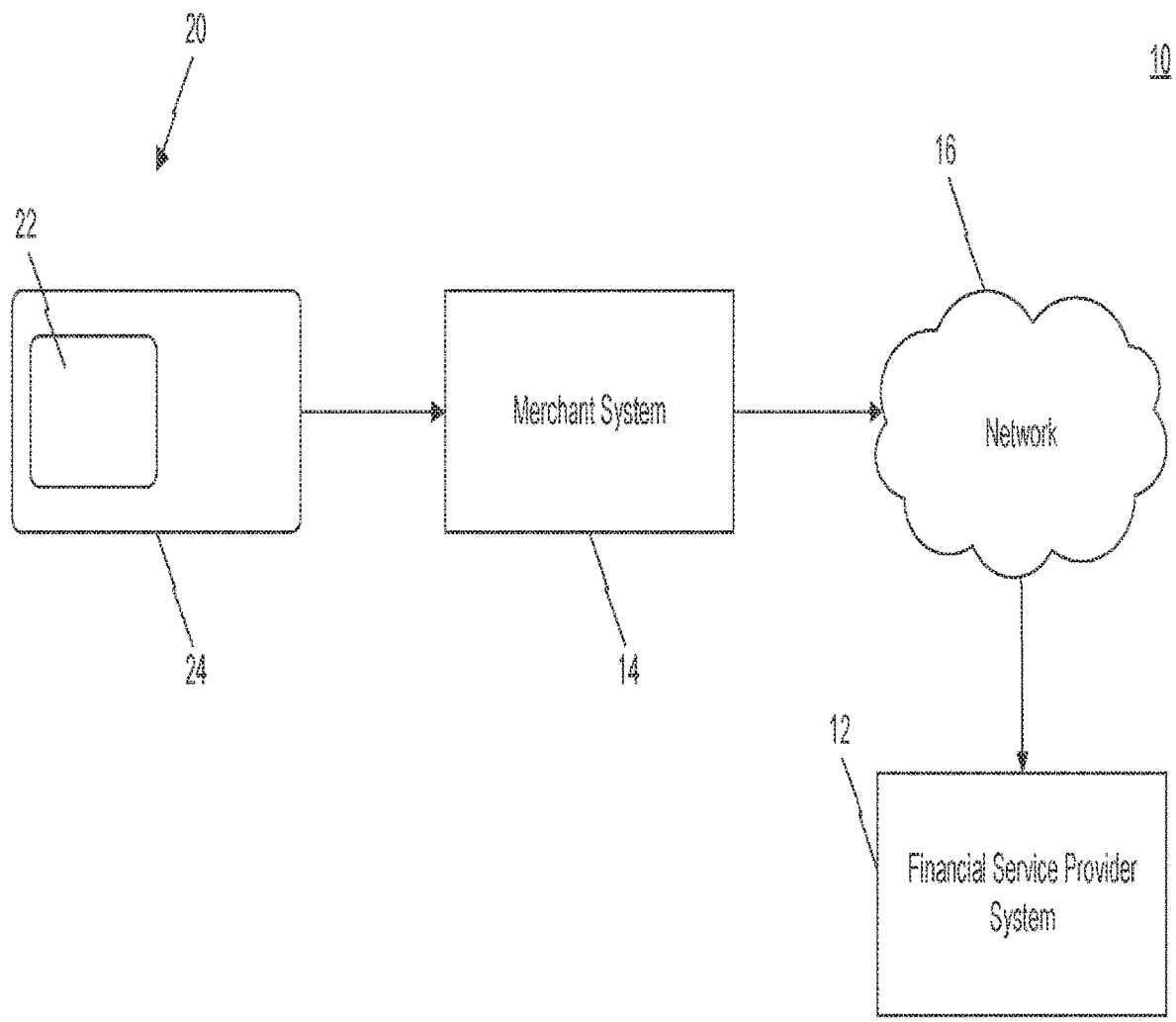
FIG. 1 is a block diagram of an exemplary transaction system, consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

Disclosed embodiments include transaction cards and methods for manufacturing a transaction card. For example, disclosed embodiments include a transaction card having a clear card body configured to house a card inlay wherein the card inlay may include a top layer and a bottom layer that may be lamination-pressed together. The card body may be substantially translucent or transparent, such that features of the card inlay may be perceivable to a viewer of the card. The card body may further include a colorant or dye to alter the transmission of light through the card body.

Alternately, the transaction card may be formed by a clear card inlay, joined to a card body. The card inlay may be substantially translucent or transparent, such that features of the card body may be perceivable to a viewer of the card.

The card inlay may further include a colorant or dye to alter the transmission of light through the card inlay.

In one embodiment, a clear card body may formed of a clear resin or resin mixture by injection-molding. A window may be milled out of the clear card body for exposing a magnetic strip (e.g., milled through completely or milled to thinness allowing the magnetic strip to be readable by a card reader) while other card details may be covered up by adhering the inlay to the clear card body. The window may have a length equal to or less than the length of the card, a width smaller or larger than the width of the magnetic strip, and a depth equal to (if milled completely) or up to the thinness of the clear card body (if not milled completely) allowing the magnetic strip to be readable by a card reader. The magnetic strip may be attached to a back surface of the card inlay. Further, the transaction card may include a second data storage component (e.g., an EMV chip, a second magnetic strip, etc.) that may be housed in the inlay.

In addition, the disclosed embodiments may include a method of manufacturing a transaction card including the steps of providing sheeted laminates out of which a top layer (i.e., a material layer) and a bottom layer (i.e., a backer layer) of a card inlay may be die-cut; laminating and pressing the top layer and the bottom layer to form the card inlay; and adhering a magnetic strip onto a back surface of the card inlay. The method further may include injection-molding a clear card body; milling a window out of the clear card body for housing the magnetic strip; and adhering the card inlay to the clear card body. Additionally, the method may include milling a pocket in the card inlay that may be configured to accommodate (or receive, affix, or secure) a data storage component, such as an electronic component. The pocket may include features that accommodate a particular geometry of data storage component or enable data storage component to be fixed (or secured, affixed, attached, or embedded) to the card inlay.

Disclosed embodiments may improve transaction card performance and reduce costs or complexity of card manufacturing when compared to traditional processes. In some embodiments of the present invention, disclosed methods of card manufacturing may allow use of best practices in conventional/traditional card manufacturing to make cards with new materials but without necessarily reinventing the whole manufacturing process altogether. Examples of new materials that may be compatible with the disclosed methods may include, but are not limited to, copper, hammered metal, wood, fabric, and stainless steel. Disclosed embodiments may also improve security performance of the transaction card, including by implementing structural features that improve the physical security of components disposed between the card inlay and the card body.

Some embodiments of the present invention leverage both lamination pressing for a card inlay construction and injection-molding for a clear card body making, which may be referred to as a hybrid card construction. Such card construction improves the durability of card details on a back surface of the card, and significantly enhances security of a magnetic strip for the card construction Some embodiments of the present invention provide efficiencies in magnetic strip adhesion, Visa or MasterCard logo printing, and other card details of traditional cards. Additionally, the clear card body made from a clear resin allows the card details printed on the backside of the card inlay to be clear and legible.

The term "transaction card," (simply referred to as a "card"), as used herein may refer to any physical card product configured to provide information, such as financial information (e.g., card numbers, account numbers, etc.), quasi-financial information (e.g., rewards balance, discount information, etc.) and/or individual-identifying information (e.g., name, address, etc.), when the card is read by a card reader. Examples of transaction cards include credit cards, debit cards, gift cards, rewards cards, frequent flyer cards, merchant-specific cards, discount cards, identification cards, membership cards, and driver's licenses, but are not limited thereto. The physical properties of the transaction card (e.g., size, flexibility, location of various components included in the card) may meet the various international standards, including, e.g., ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/IEC 7810.

FIG. 1 illustrates an exemplary transaction system 10. Transaction system 10 may include a computing system configured to receive and send information between the components of transaction system 10 and components outside of transaction system 10. Transaction system 10 may include a financial service provider system 12 and a merchant system 14 communicating with each other through a network 16. Transaction system 10 may include additional and/or alternative components.

Financial service provider system 12 may include one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service accounts. Financial service accounts may be associated with physical financial service transaction cards, such as credit or debit cards that customers use to perform financial service transactions, such as purchasing goods and/or services online or at a point of sale (POS) terminal. Financial service accounts may also be associated with electronic financial products and services, such as a digital wallet or similar account that may be used to perform electronic transactions, such as purchasing goods and/or services online.

Merchant system 14 may include one or more computer systems associated with a merchant. For example, merchant system 14 may be associated with an entity that provides goods and/or services (e.g., a retail store). The merchant may include brick-and-mortar location(s) that a customer may physically visit and purchase goods and services using the transaction cards. Such physical locations may include computing devices (e.g., merchant system 14) that perform financial service transactions with customers (e.g., POS terminal(s), kiosks, etc.). Additionally or alternatively, merchant system 14 may be associated with a merchant who provides an electronic shopping environment, such as a website or other online platform that consumers may access using a computer through a browser, a mobile application, or similar software. Merchant system 14 may include a client device, such as a laptop computer, desktop computer, smart phone, or tablet, which a customer may operate to access the electronic shopping mechanism.

Network 16 may include any type of network configured to facilitate communications and data exchange between components of transaction system 10, such as, for example, financial service provider system 12 and merchant system 14. Network 16 may include a Local Area Network (LAN), a Wide Area Network (WAN), such as the Internet. Network 16 may be a single network or a combination of networks. Network 16 is not limited to the above examples and transaction system 10 may implement any type of network that allows entities (shown and not shown) of transaction system 10 to exchange data and information.

Transaction system 10 may be configured to conduct a transaction using a transaction card 20. In some embodiments, financial service provider system 12 may provide transaction card 20 to a customer for use in conducting transactions associated with a financial service account held by the customer. For example, the customer may use transaction card 20 at a merchant location to make a purchase. During the course of the purchase, information may be transferred from transaction card 20 to merchant system 14 (e.g., a point of sale device). Merchant system 14 may communicate with financial service provider system 12 via network 16 to verify the information and to complete or deny the transaction. For example, merchant system 14 may receive account information from transaction card 20. Merchant system 14 may transmit the account information and a purchase amount, among other transaction information, to financial service provider system 12. Financial service provider system 12 may settle the transaction by transferring funds from the customer's financial service account to a financial service account associated with the merchant.

While transaction system 10 and transaction card 20 may be depicted and described in relation to transactions that involve customers, merchants, and financial service providers, it should be understood that these entities may be used only as an example to illustrate one environment in which transaction card 20 may be used. Transaction card 20 is not limited to financial products and may be any physical card product that is configured to provide information to another device when read by a card reader. For example, transaction card 20 may be an identification card configured to provide information to a device in order to identify the holder of the card (e.g., driver's license).

In some embodiments, transaction card 20 may further include an electronic component 22 disposed on or in a transaction card body ("card body") 24. As used herein, an "electronic component" may be one or more devices and/or elements configured to receive, store, process, provide, transfer, send, delete, and/or generate information. For example, electronic component 22 may be a microchip (e.g., a Europay, MasterCard, and Visa (EMV) chip), a communication device (e.g., Near Field Communication (NFC) antenna, Bluetooth® device, WiFi device), a magnetic strip, a barcode, Quick Response (QR) code, etc. Electronic component 22 may be secured (or affixed, attached) to card body 24 in such a way that allows card body 24 to carry electronic component 22 while maintaining a utility of electronic component 22 (i.e., allowing electronic component 22 to interact with merchant system 14). Herein, the utility of electronic component 22 indicates that electronic component 22 functions properly, for example, a card containing RFID (radio frequency identification) shielded by a layer can be properly read by an RFID reader through the layer.

Figure 2:
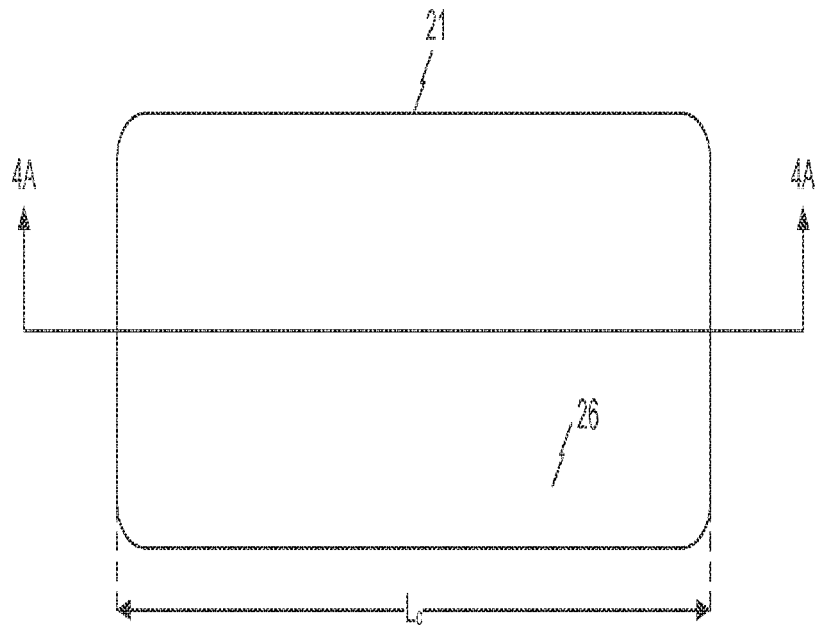
FIG. 2 is a front view of a first exemplary transaction card, consistent with disclosed embodiments.
Figure 3:
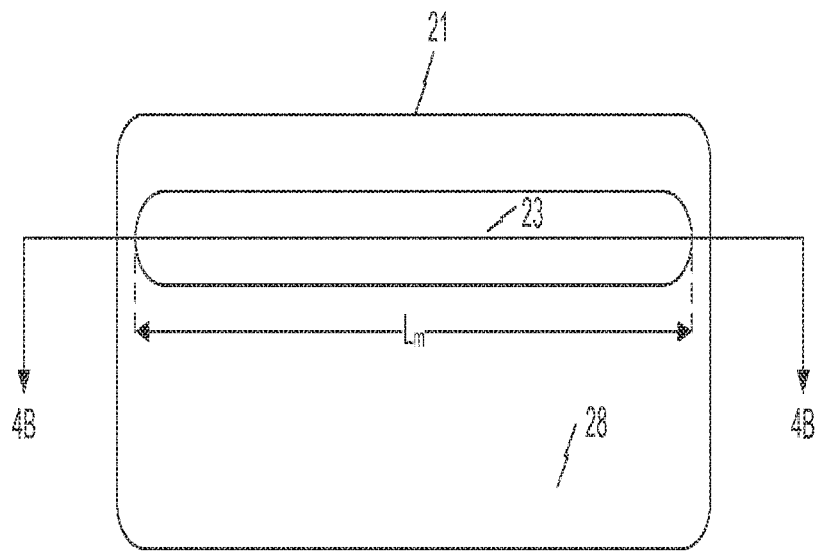
FIG. 3 is a back view of the first exemplary transaction card, consistent with disclosed embodiments.

FIG. 2 is a front view of a first exemplary card 21 without a visible electronic component (e.g., microchip). FIG. 3 is a rear view of the first exemplary card 21. FIG. 2 shows a front surface 26 of card 21 with a length defined as $L_c$, and FIG. 3 shows a rear surface 28 of card 21 with a surface 23 of a magnetic strip exposed. The magnetic strip may have a length $L_m$ which may be less than the card length $L_c$, and surface 23 may be flush with rear surface 28. Further, front surface 26 may include a customer name and a signature associated with the customer (not shown). The signature may be etched by, for example a fiber laser. In some embodiments, the signature may be included on another surface of card 21, such as an inner surface of the card inlay or card body, and visible, for example, through the front surface 26 of the clear component, in this case the front surface of the transaction card. Additionally, where colorants or dyes are utilized to alter the transmission of light through the clear component, data may be printed in a color selected to be not visible through the colored clear component in the absence of light or other emissions outside the visible spectrum.

Figure 4A:
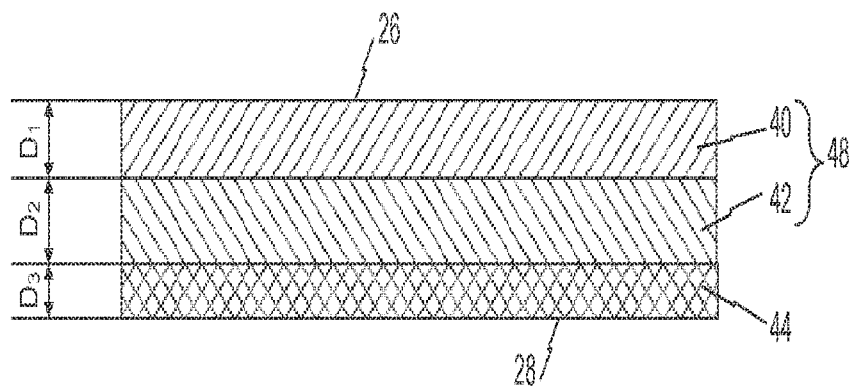
FIG. 4A is a cross-sectional view of the first exemplary transaction card in FIG. 2 taken along line 4A-4A, consistent with disclosed embodiments.

FIG. 4A illustrates a cross-sectional view of the first exemplary embodiment of card 21 shown in FIG. 2 taken along line 4A-4A of FIG. 2. FIG. 4A is a magnified view of the card construction which illustrates surfaces 26 and 28, a top layer 40 of an inlay 48, a bottom layer 42 of inlay 48, and a clear card body 44. Top layer 40, bottom layer 42, and clear card body 44 have a thickness of $D_1$, $D_2$, and $D_3$, respectively. As shown in FIG. 4A, the thicknesses of $D_1$, $D_2$, and $D_3$ are magnified for illustrative purpose only, thus those thicknesses are not necessarily equal to, less than, or greater than one another. Accordingly, those thicknesses may vary based on the dimensions of card 21, materials employed for making components of card 21, and/or processes utilized for manufacturing components of card 21.

Top layer 40 may be manufactured by die-cutting a sheet laminate formed of a material or combination of materials, for example polycarbonate (PC) resin or other similar materials. Bottom layer 42 may be manufactured by die-cutting a sheeted laminate formed of a material or combination of materials, for example polyvinyl chloride (PVC) resin or other similar materials. Top layer 40 and bottom layer 42 may be laminated and pressed together to form inlay 48.

In some embodiments, card information may be added to a back surface of inlay 48. The card information may include, but is not limited to, card number, expiration date of the card, VISA/Mastercard logo, hologram, and/or card issuing company logo, which may be visible through clear card body 44. Further, such card information may be well secured and protected from wearing off during the service life of transaction card due to the covering-up of the clear card body, thus significantly improving the durability of the card during use.

Clear card body 44 may be manufactured using a molding process, such as an injection-molding process or a compression-molding process. The material of clear card body 44 may be a resin mixture comprising a thermoplastic elastomer (TPE), which renders clear card body 44 substantially translucent or transparent with a soft-touch feel. TPEs may include types of copolymers and/or mixtures of polymers that exhibit properties of thermoplastics and elastomeric materials. For example, the resin mixture may include a polyester elastomer, a block copolymer, a thermoplastic olefin, an elastomeric alloy, a thermoplastic polyurethane, a thermoplastic copolyester, or a thermoplastic polyamide. Additionally, colorants or dies may be added to the mixture.

Figure 4B:
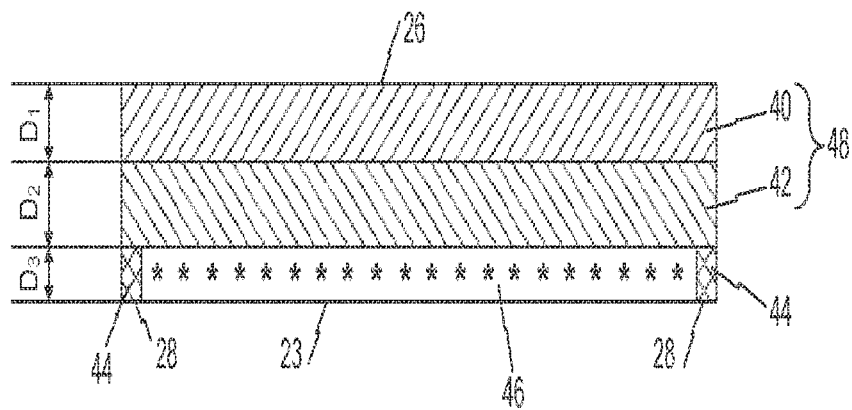
FIG. 4B is a cross-sectional view of the first exemplary transaction card in FIG. 3 taken along line 4B-4B, consistent with disclosed embodiments.

FIG. 4B illustrates a cross-sectional view of the first exemplary embodiment of card 21 shown in FIG. 3 taken along line 4B-4B of FIG. 3. FIG. 4B is a magnified view of the card construction which illustrates surfaces 23,26 and 28, top layer 40 of inlay 48, bottom layer 42 of inlay 48, clear card body 44, and a magnetic strip 46. As shown in FIG. 4B, surface 23 of magnetic strip 46 sits flush with surface 28 of clear card body 44.

Figure 5:
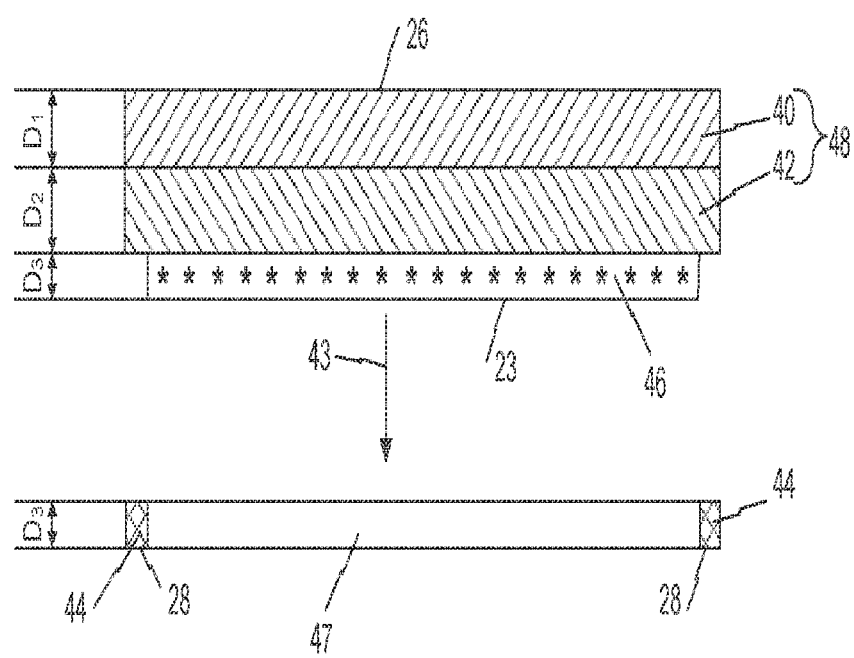
FIG. 5 is a disassembled cross-sectional view of the first exemplary transaction card of FIG. 4B, consistent with disclosed embodiments.

To further explain the card construction of the first exemplary embodiment of card 21, FIG. 5 shows a disassembled cross-sectional view of the first exemplary transaction card in FIG. 4B, depicting inlay 48 including top layer 40 and bottom layer 42, magnetic strip 46, and clear card body 44 with a window 47 cut out. As shown in FIG. 5, clear card body 44 has a same thickness $D_3$ as magnetic strip 46 such that surface 23 of magnetic strip 46 may be configured to be flush with surface 28 of clear card body 44 by adhering clear card body 44 to inlay 48, as indicated by an arrow 43.

Accordingly, some embodiments of the present invention provide an ability to secure the magnetic strip without losing any desirable design features of a card, such as beveled edges. When the magnetic strip is received in the window formed in the clear card body, the thickness of the magnetic strip may compensate the depth of the window, such that the magnetic strip comes through that window and sits flush with the back of the card. The magnetic strip may thus be secured, while also providing an extra layer of protection to protect card details added (e.g., by printing) to a back surface of the card inlay for improving the durability of the card.

In some embodiments, window 47 may be manufactured using a milling process, such as a computer numerical control (CNC) milling process or another automated, semi-automated, or manual milling process. The milling process may include milling away a space (i.e., window 47) of a desired size and geometry for accommodating or receiving magnetic strip 46.

The gap between side edges of magnetic strip 46 and side edges of card body window 47 may have a tolerance equal to or less than +/−0.5 mm, which may be determined in part by a card construction and/or methods for assembling a card. Such a tolerance provides security benefits by preventing, for example, a tool from being inserted into the gap and under an edge of the magnetic stripe, thus precluding the tool from being used to remove a complete magnetic stripe. Accordingly, by having the magnetic strip come exposed straight through the cutout window, security of the magnetic strip may be significantly improved while allowing proper and efficient operation of the magnetic strip. In some embodiments of the present invention, a standard magnetic strip, as used in a traditional card construction, may be used and functionally exposed through the cutout window without affecting functions of the standard magnetic strip, such that, further research and development on the magnetic strip itself may be avoided, reducing card manufacturing costs.

Figure 6:
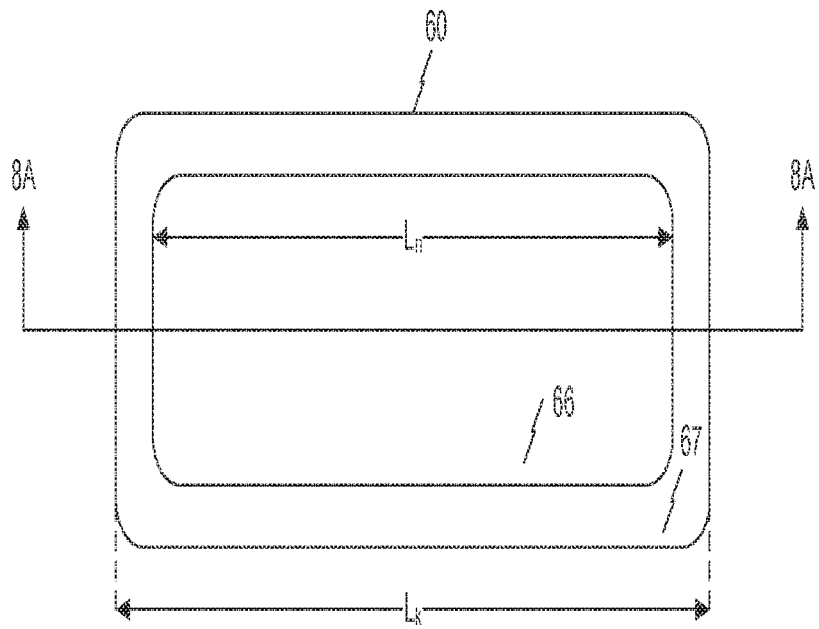
FIG. 6 is a front view of a second exemplary transaction card, consistent with disclosed embodiments.
Figure 7:
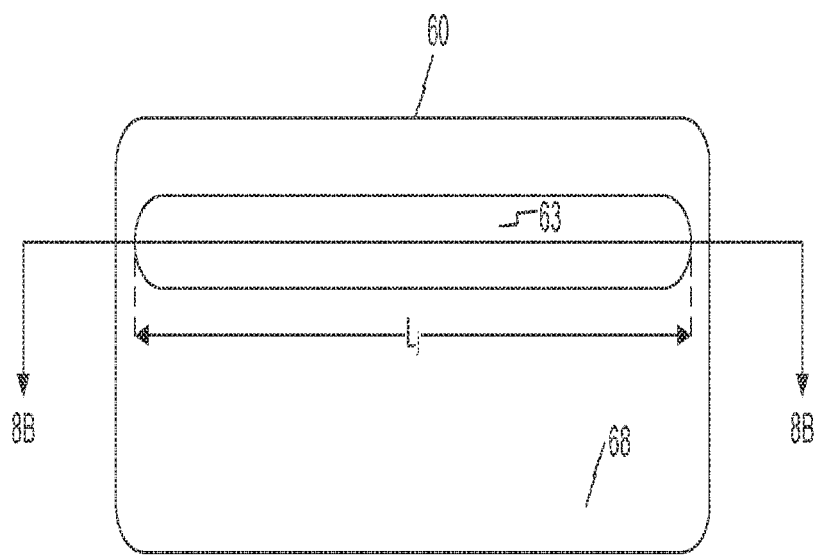
FIG. 7 is a back view of the second exemplary transaction card, consistent with disclosed embodiments.

FIG. 6 is a front view of a second exemplary transaction card, referred to as card 60 herein, consistent with disclosed embodiments. FIG. 7 is a back view of the second exemplary transaction card, consistent with disclosed embodiments. FIG. 6 shows a front surface 66 of an inlay of card 60, and a front surface 67 of a clear card body of card 60. The length $L_n$ of the inlay may be less than the length $L_k$ of the clear card body. FIG. 7 shows a rear surface 68 of card 60 with a surface 63 of a magnetic strip exposed. The magnetic strip has a length L which may be less than or equal to the inlay length $L_n$, and surface 63 may be flush with rear surface 68.

Compared with the first exemplary card 21, description of second exemplary card 60 is focused on configuration characteristics of card construction. Other details and aspects may be the same or similar to first exemplary card 21, including materials and process for manufacturing a card, therefore, will not be repeated.

Figure 8A:
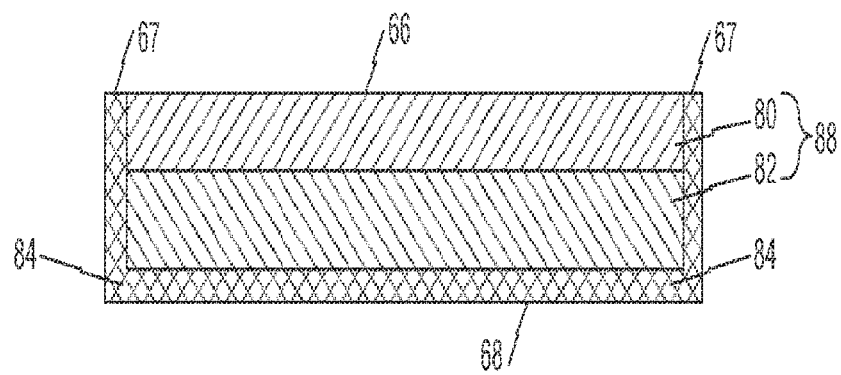
FIG. 8A is a cross-sectional view of the second exemplary transaction card in FIG. 6 taken along line 8A-8A, consistent with disclosed embodiments.

FIG. 8A shows a cross-sectional view of the second exemplary transaction card shown in FIG. 6 taken along line 8A-8A of FIG. 6. FIG. 8A is a magnified view of card construction which illustrates surfaces 66, 67 and 68, a top layer 80 of an inlay 88, a bottom layer 82 of inlay 88, and a clear card body 84. As shown in FIG. 8A and FIG. 4A, a primary configuration difference between card 60 and card 21 is the configuration of a clear card body. In card 60, clear card body 84 encloses inlay 88 circumferentially with front surface 67 flush with front surface 66 of inlay 88, whereas in card 21, inlay 48 may be disposed directly above clear card body 44.

Figure 8B:
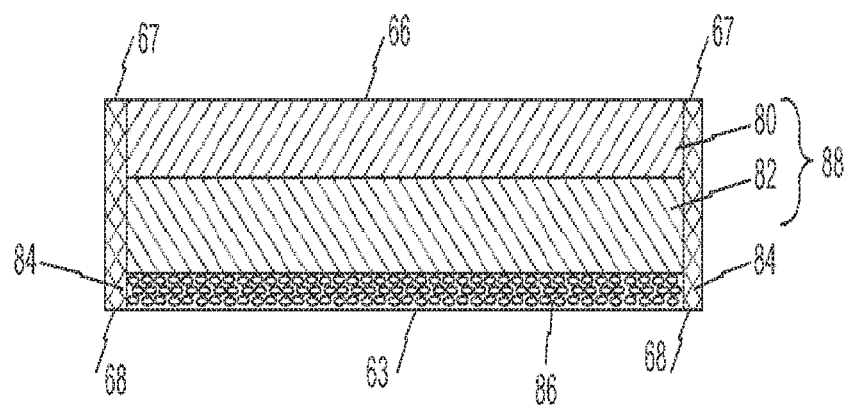
FIG. 8B is a cross-sectional view of the second exemplary transaction card in FIG. 7 taken along line 8B-8B, consistent with disclosed embodiments.

FIG. 8B is a cross-sectional view of the second exemplary transaction card in FIG. 7 taken along line 8B-8B of FIG. 7, which illustrates a surface 63 of a magnetic strip 86, front surface 66 of inlay 88, front surface 67 of clear card body 84, and rear surface 68 of clear card body 84. FIG. 8B further shows magnetic strip 86 coming through a window cut out of clear card body 84. As shown in FIG. 8B, surface 63 of magnetic strip 86 may be flush with rear surface 68 of clear card body 84.

Figure 9A:
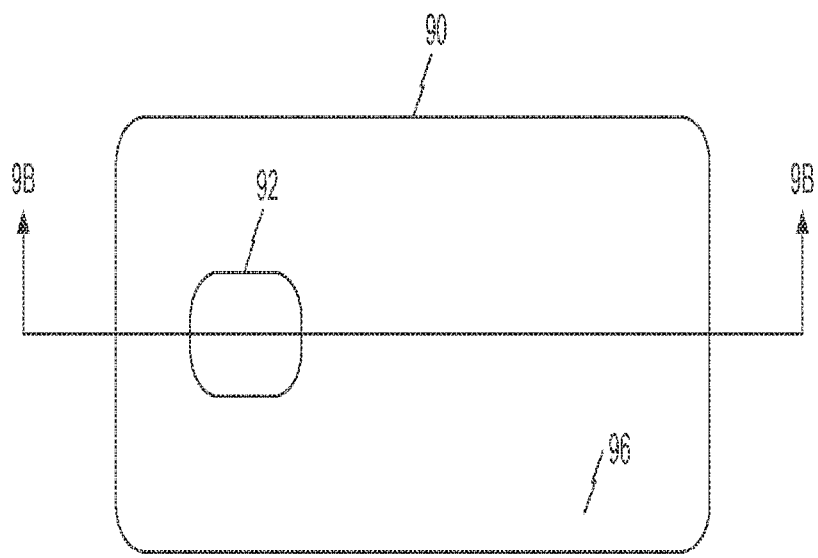
FIG. 9A is a front view of a third exemplary transaction card, consistent with disclosed embodiments.

FIG. 9A is a front view of a third exemplary transaction card, referred to as card 90, consistent with disclosed embodiments. As shown in FIG. 9A, a microchip or similar component 92 and a front surface 96 of card 90 are illustrated. Other than component 92 being housed in an inlay of card 90, other details and aspects may be the same or similar to first exemplary card 21, thus, will not be described herein.

Figure 9B:
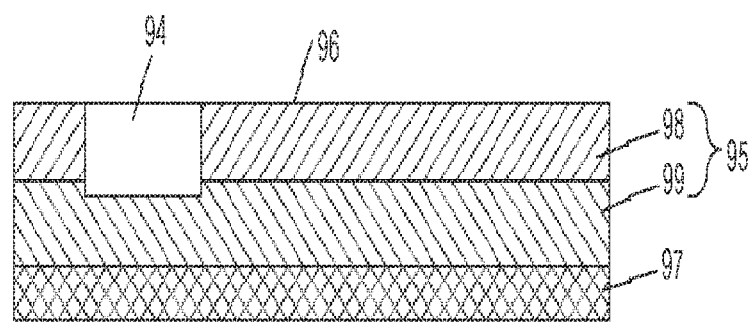
FIG. 9B is a back view of the third exemplary transaction card, consistent with disclosed embodiments.

FIG. 9B is a cross-sectional view of the third exemplary card 90 in FIG. 9A taken along the line 9B-9B of FIG. 9A, which shows an inlay 95 comprising a top layer 98 and a bottom layer 99, and a clear card body 97. Further, FIG. 9B illustrates a pocket 94 cut out of inlay 95 by, for example, a milling process. Pocket 94 is configured to embed component 92 and may not cut through a magnetic strip attached to bottom layer 99 of inlay 95. The dimensions and depths of pocket 94 may be set based on a plurality of criteria such as the size and geometry of a particular microchip, industry standards, manufacturing tolerances, or other considerations.

In some embodiments, a Shore A hardness of the clear card body can depend on the TPE selected to form the clear card body and/or the use of other materials. As used herein, Shore A hardness may refer to durometer hardness on the Type A durometer scale (i.e., durometer hardness determined using a durometer or micrometer according to the ASTM D2240 Type A durometer configuration).

In some embodiments, a Shore D hardness (different from Shore A hardness) of the clear card body can depend on the TPE used to form the clear card body, based on the selected TPE and/or the use of other materials. As used herein, Shore D hardness may refer to durometer hardness on the Type D durometer scale (i.e., durometer hardness determined using a durometer or micrometer according to the ASTM D2240 Type D durometer configuration).

The durometer hardness of a material may relate to or be indicative of a soft touch feel quality of the material. That is, to form a clear card body having a desired soft touch feel, the TPE may be selected based in part on the durometer hardness (e.g., a hardness value or range of values) associated with the TPE.

The durometer hardness of a material may also relate or be indicative of a durability of the material. That is, materials with a higher durometer hardness may be more resistant to wear (e.g., frictional wear) than materials having a lower durometer hardness. For example, the durability of a transaction card having a clear card body formed of a resin that includes a TPE of high durometer hardness (e.g., a Shore A hardness greater than 15 or a Shore D hardness of 70-85) may be used (i.e., swiped) more times than a transaction card having a clear card body formed of a resin that includes a TPE of lower durometer hardness (e.g., a Shore A hardness less than 15).

Adding other materials of different durometer hardness to the resin for forming a clear card body (i.e., mixtures of the TPE with other materials of different durometer hardness) may influence (e.g., raise or lower) the durometer hardness of the card body with respect to the durometer hardness of any one of its constituent materials. For example, other materials, such as acetal homopolymers, polybutylene terephthalate (PBT), and/or other materials may be mixed with a TPE to form the resin for forming a clear card body. Adding other such materials may impart desired mechanical properties on a clear card body and/or a card as a whole while providing for an enhanced soft touch feel and durability in comparison to known transaction cards and card coatings.

In some embodiments, the TPE used to form a clear card body may have a flexure modulus in the range of 500-1150 MPa. In this way, the TPE used to form a clear card body may be relatively flexible in addition to having improved soft touch feel and durability. Depending on the selected TPE and/or other materials used in the resin for forming the clear card body, the selected TPE may have a different flexure modulus, if desired.

The resin mixture for forming a clear card body may further include materials for increasing the strength and durability of the card body and/or the card as a whole. For example, the resin mixture for forming a clear card body may include an acetal homopolymer. Acetal homopolymers may include commercially available acetal homopolymers, such as Delrin® made by DuPont®. Other or different commercially available homopolymers may be used, if desired.

In some embodiments, a data storage component may be attached to a clear card body while a window may be formed in an inlay for exposing the data storage component (e.g., the window may be milled through the inlay completely or milled to thinness allowing the data storage component to function with an external reader). Further in some embodiments, a second data storage component may be housed in a clear card body.

In some embodiments, an inlay may be clear in addition to a clear card body. For example, a top layer and/or a bottom layer of an inlay may be clear in addition to a clear card body. Alternately, in some embodiments, an inlay may be clear while a card body may not be clear.

In some embodiments, an inlay may be non-opaque. That is, the inlay may be formed of a material configured to allow visible light to pass therethrough. In some embodiments, the non-opaque inlay may comprise a transparent or translucent material. The transparent or translucent material may, in some embodiments, be configured to diffuse light—i.e., the inlay may have light diffusing properties and be a light diffuser or light-diffusing inlay.

For example, the inlay may be formed of material that causes light passing therethrough to be diffused to achieve a desired aesthetic and/or operational function. For example, when exposed to ambient light (i.e., light produced by any external source), the inlay may be configured to produce a desired aesthetic appearance of the card by diffusing light from the source (e.g., to cause the card to appear "lit up" and/or to cause visual details on the card to become visible or appear differently). The light diffusing ability of the inlay may function to spread light emitted by the light source across the inlay to create a more even distribution of light intensity, as seen by a card user.

The light-diffusing inlay may be formed of light-diffusing materials, such as acrylic, polycarbonate (PC), polyethylene terephthalate (PET), and/or other materials configured to diffuse light. In other embodiments, the light-diffusing inlay may include one or more commercially available light diffusing films. For example, the inlay (or a component thereof) may be cut from a roll or sheet of light diffusing material. Cutting, stamping, milling, laser cutting, and/or other processes may be used to form a light diffusing layer or inlay from rolls or sheets of commercially available light diffusing material.

In some embodiments, a reflective material may be positioned behind the inlay to reflect back ambient light passing through the inlay. For example, a mirror, a metal-coated or metal-plated material, a polished metal film, a tinted glass or plastic material, or another type of reflective material may be positioned behind (i.e. adjacent to) the inlay to cause light passing through the inlay to be reflected back through the inlay. In this way, the card may appear brighter when ambient light is cast upon the card.

Further, in some embodiments, a window for exposing a first data storage component may be formed in an inlay instead of in a card body. In some embodiments, a pocket for housing a second data storage component may be formed in a card body instead of in an inlay. Alternatively, both a window for exposing a first data storage component and a pocket for housing a second data storage component may be formed either in a card body or in an inlay.

Figure 10:
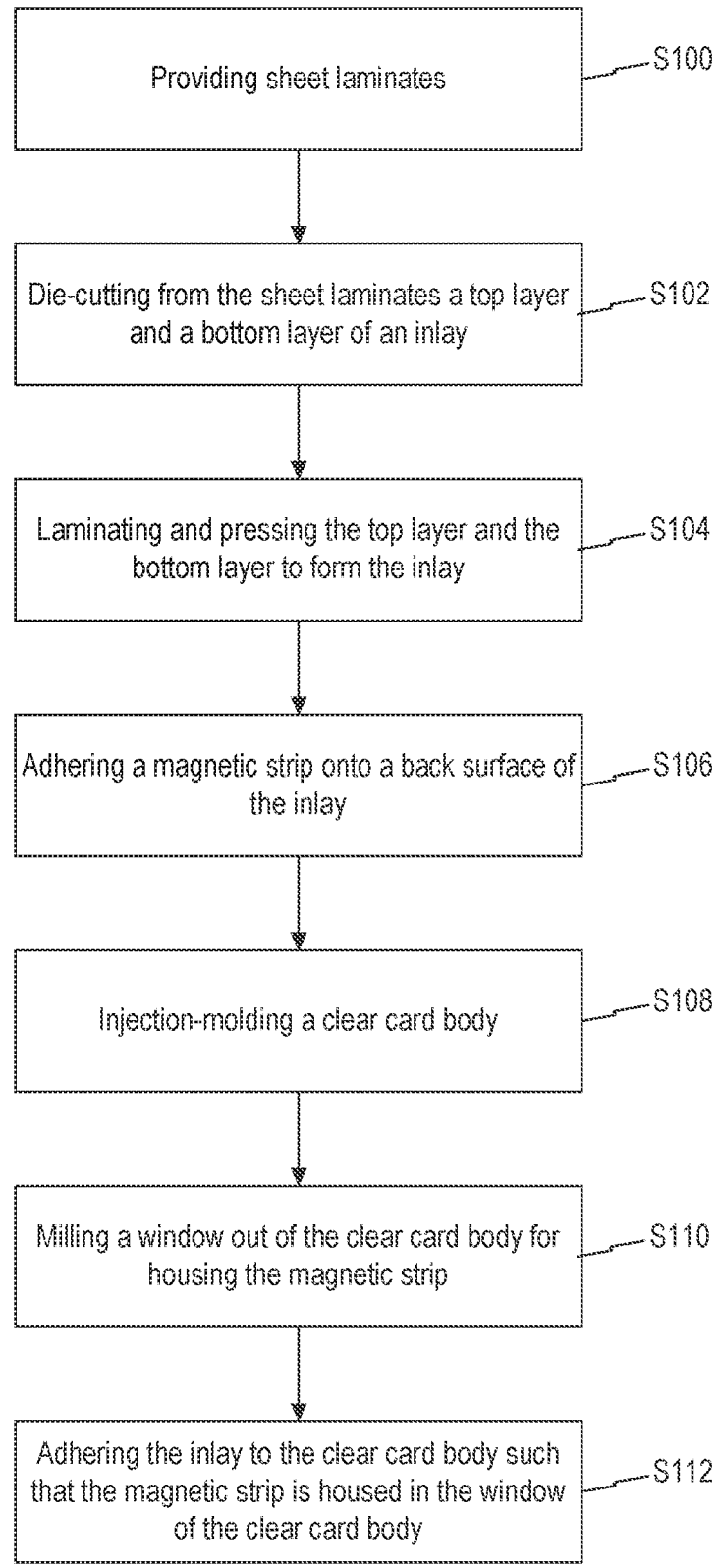
FIG. 10 is a flowchart showing an exemplary method for constructing a transaction card, consistent with the disclosed embodiments.

FIG. 10 is a flowchart showing an exemplary method/process for forming a transaction card according to some embodiments of the present invention. The exemplary method may include providing sheet laminates (Step S100). The sheet laminates may be formed of polyvinyl chloride (PVC) or polycarbonate (PC), or other similar materials.

Figure 11A:
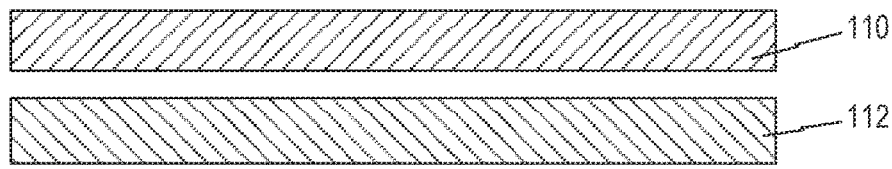
FIG. 11A is a cross-sectional view of a top layer and a bottom layer of an inlay according to the exemplary method in FIG. 10.

The process proceeds to step S102, where a top layer and a bottom layer of a card inlay may be die-cut from the sheet laminates. For example, the top layer may be formed from a PC laminated sheet and the bottom layer may be formed from a PVC laminated sheet. FIG. 11A illustrates a cross-sectional view of a top layer 110 formed from a first laminated sheet (e.g., a PC sheet), as well as a cross-sectional view of a bottom layer 112 formed from a second laminated sheet (e.g., a PVC sheet).

Figure 11B:
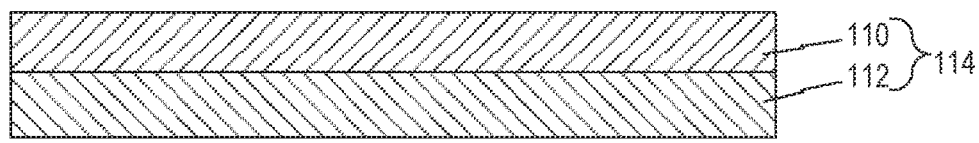
FIG. 11B is a cross-sectional view of an inlay according to the exemplary method in FIG. 10.

In step S104, the top layer and the bottom layer may be joined together, for example, by laminating and/or pressing to form the inlay. As shown in FIG. 11B, a cross-sectional view of an inlay 114 are depicted that includes top layer 110 and bottom layer 112.

Figure 11C:
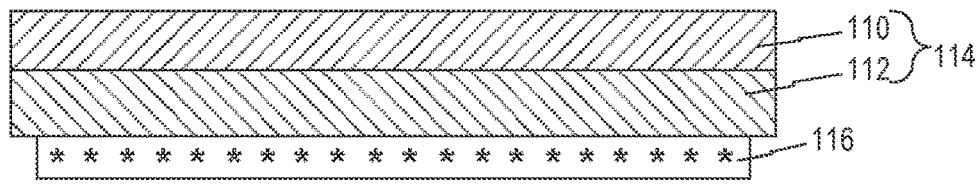
FIG. 11C is a cross-sectional view of the inlay attached with a magnetic strip according to the exemplary method in FIG. 10.

The process proceeds to step S106, where a magnetic strip may be adhered onto a back surface of the inlay. As shown in FIG. 11C, a cross-sectional view of a magnetic strip 116 may be depicted that may be affixed to a back surface of inlay 114.

Some embodiments of the present invention offer efficiencies in the adhesion of the magnetic strip to the back surface of the inlay. By securing the magnetic strip to the back surface of the inlay, a backer material may be added to a portion of the back surface of the inlay. An improved adhesion of magnetic strip to the back surface of the inlay may thus be achieved due to a greater amount of material surface area used in this magnetic strip adhesion process, or as a result of a surface condition (i.e., roughness and/or porosity) selected to provide improved bonding between the inlay and the magnetic stripe. With such substantially greater bonding between the card inlay and the magnetic strip, it may be very difficult or impossible to peel off the magnetic strip without damaging the magnetic strip.

The process proceeds to step S108, where a clear card body may be injection-molded. As discussed previously, the clear card body may be manufactured using a molding process, such as an injection molding process or a compression molding process. Alternatively, the clear card body may be formed by a laminating and/or pressing process.

A resin mixture used for injection-molding the clear card body may comprise a thermoplastic elastomer (TPE). The TPE may be a thermoplastic elastomer consistent with embodiments discussed above. For example, the TPE may be a polyester elastomer, such as Hytrel® or another type of TPE. The TPE may have a flexure modulus in the range of 500-1150 MPa. The TPE may also have a Shore A hardness greater than 15 and a Shore D hardness less than 85. For example, the TPE may have a Shore D hardness in the range of 70-85.

The resin mixture may further comprise materials for increasing the strength and durability of the clear card body and/or the an assembled card as a whole. For example, in addition to TPE, the resin mixture may include acetal homopolymer, polybutylene terephthalate (PBT), and or other materials. The acetal homopolymer may have a Rockwell M hardness in the range of 18-94 and a Rockwell R hardness in the range of 102-122. The PBT may have a flexural modulus in the range of 1600-8500 MPa and a flexural strength in the range of 50-200 MPa. Other types of acetal homoplymers, PBTs, and/or other materials may be included in the resin mixture, if desired.

In some embodiments, the resin mixture may be compression-molded or extruded. In other embodiments, the resin mixture may be rolled, extruded, or otherwise processed to form sheets of clear card body stock. The clear card body stock may be milled in a CNC, semi-automated, or manual milling process. Additionally, features of a clear card body, such as a window, may be formed during the molding process (e.g., the injection molding process) and/or during the milling process.

Figure 11D:
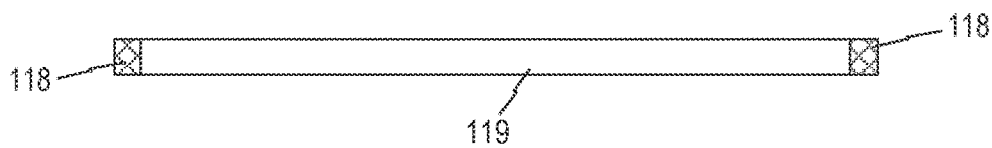
FIG. 11D is a cross-sectional view of a clear card body out of which a window is cut according to the exemplary method in FIG. 10.

In step S110, a window may be formed in the clear card body for housing the magnetic strip. As discussed previously, the window may be formed using a milling process, such as a computer numerical control (CNC) milling process or another automated, semi-automated, or manual milling process. As shown in FIG. 11D, a cross-sectional view of a clear card body 118 is depicted with a window 119 milled out of clear card body 118. Alternatively, the window may be formed as part of an injection molding process for manufacturing a clear card body. Further, alternatively, the window may be formed by a grinding process. Additionally, the window may be formed by a laser cutting process or any other suitable process of material removal.

Figure 11E:
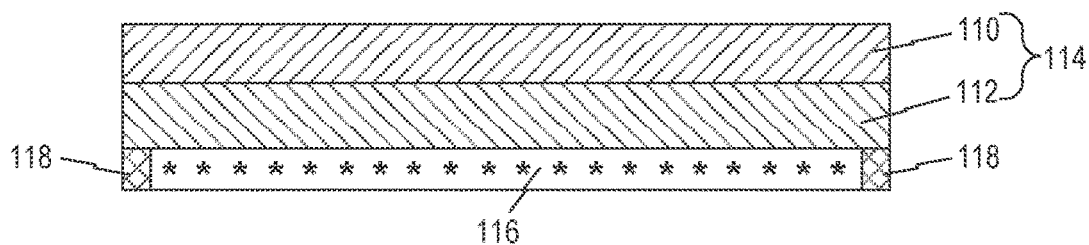
FIG. 11E is a cross-sectional view of an assembled card construction according to the exemplary method FIG. 10.

The process ends at step S112, where the inlay may be adhered to the clear card body such that the magnetic strip may be housed in the window of the clear card body. As shown in FIG. 11E, a cross-sectional view of an assembled card construction may be illustrated displaying magnetic strip 116 being embedded into window 119 of clear card body 118.

In some embodiments, the method/process may further include milling out a pocket in a card inlay for embedding a microchip. In some embodiments, the method/process may further include adding card information to a back surface of the card inlay and/or to a front surface of the card inlay, for example, prior to joining the inlay to the clear card body. The card information may include, but is not limited to, card number, expiration date of the card, VISA/Mastercard logo, hologram, card issuing company logo, customer/car holder's name and associated signature that may be laser etched or engraved.

While illustrative embodiments have been described herein, the scope includes any and all embodiments having equivalent elements, modifications, omissions, combinations (e.g., of aspects across various embodiments), adaptations or alterations based on the present disclosure. For example, the order of the steps of the above exemplary method may be rearranged in any preferred or suitable order, or any step may be removed or added.

Also, for example, in some embodiments, a milling process may be used to form a clear card body instead of an injection molding or compression molding process. In other embodiments, different types of TPEs than those mentioned herein may be used and/or mixed with other material.

The elements in the claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A transaction card comprising:
   a card inlay comprising a light-diffusing material having an outer surface and an inner surface opposite thereto; and
   a card body comprising an outer surface and an inner surface opposite thereto;
   wherein:
      the card inlay is joined to the card body such that the outer surface of the card inlay substantially forms a first outer surface of the transaction card and the outer surface of the card body forms a second outer surface of the transaction card; and;
      a portion of the inner surface of the card inlay contacts a reflective material positioned between the inner surface of the inlay and the inner surface of the body.

2. The transaction card of claim 1, further comprising:
   a first data storage component having a first and second surface opposite thereto; and
   a window formed in the transaction card and housing the first data storage component:
      wherein the second surface of the first data storage component is substantially flush with a portion of the second outer surface of the transaction card; and the first data storage component is exposed through the window.

3. The transaction card of claim 2, wherein the first surface of the first data storage component is substantially flush with a portion of the first outer surface of the transaction card.

4. The transaction card of claim 2, wherein a portion of the inner surface of the card body is substantially flush with the outer surface of the card inlay and forms a portion of the first outer surface of the transaction card.

5. The transaction card of claim 2, wherein:
   the card inlay comprises a pocket formed therein; and
   the transaction card comprises a second data storage component embedded in the pocket.

6. The transaction card of claim 2, wherein the first data storage component is a magnetic strip.

7. The transaction card of claim 2, wherein:
the window has a plurality of side walls and the first data storage component has a plurality of side walls; and
a gap between the plurality of side walls of the window and the plurality of side walls of the first data storage component has a tolerance less than +/−0.5 mm.

8. The transaction card of claim 1, wherein the card inlay is substantially translucent.

9. The transaction card of claim 1, wherein both the card inlay and the card body are substantially translucent.

10. The transaction card of claim 1, wherein:
the reflective material comprises a mirror, a metal-coated or metal-plated material, a polished metal film, or a tinted glass or plastic material.

11. The transaction card of claim 10, wherein the top layer is made of polycarbonate.

12. The transaction card of claim 10, wherein the bottom layer is made of polyvinyl chloride.

13. The transaction card of claim 1, wherein:
the card inlay includes a top layer and a bottom layer; and
the top layer and the bottom layer are lamination-pressed to form the card inlay.

14. A method of manufacturing a transaction card comprising:
forming a top layer of a card inlay from a first sheet laminate and a bottom layer of the card inlay from a second sheet laminate;
forming a light-diffusing film;
forming the card inlay by joining the top layer, the bottom layer, and the light-diffusing film;
forming a card body;
adhering the card inlay to the card body such that:
a portion of the inner surface of the card inlay contacts a reflective material positioned between the inner surface of the inlay and the inner surface of the body.

15. The method of claim 14, further comprising:
attaching a first data storage component to an inner surface of the card inlay;
forming a window in the card body;
creating a pocket in the card inlay; and
embedding a second data storage component in the pocket.

16. The method of claim 15, wherein the second data storage component is a microchip.

17. The method of claim 15, wherein the window is formed by a milling process.

18. The method of claim 14, wherein the card body is injection-molded.

19. The method of claim 14, wherein the card body is substantially translucent and made of a clear resin mixture including a thermoplastic elastomer.

20. The method of claim 14, wherein the top layer and the bottom layer are lamination pressed to form the card inlay.

* * * * *